US005693693A

United States Patent [19]
Auslander et al.

[11] Patent Number: 5,693,693
[45] Date of Patent: Dec. 2, 1997

[54] BAR CODE PRINTING AND SCANNING USING WAX BASED INVISIBLE FLUORESCENT INKS

[75] Inventors: Judith D. Auslander, Westport; William Berson, Weston, both of Conn.

[73] Assignee: Pitney Bowes, Inc., Stamford, Conn.

[21] Appl. No.: 348,014

[22] Filed: Dec. 1, 1994

[51] Int. Cl.$^6$ .............................. C08K 5/34; C08L 91/06
[52] U.S. Cl. .............................. 524/88; 524/62; 524/198; 524/277; 524/563; 524/403; 523/161; 260/DIG. 38; 106/21 A; 106/23 D
[58] Field of Search .............................. 524/88, 277, 563, 524/198, 62, 403; 106/21 A, 23 D; 523/161; 260/DIG. 38

[56] References Cited

U.S. PATENT DOCUMENTS

| | | | |
|---|---|---|---|
| 4,572,803 | 2/1986 | Yamazoe et al. | 534/16 |
| 4,918,047 | 4/1990 | Ikeda et al. | 503/216 |
| 5,431,697 | 7/1995 | Kamata et al. | 8/483 |

FOREIGN PATENT DOCUMENTS

| | | |
|---|---|---|
| A20340898 | 11/1989 | European Pat. Off. . |
| 1471367 | 1/1967 | France . |
| 63-191870 | 8/1988 | Japan . |
| B2090194 | 4/1985 | United Kingdom . |

OTHER PUBLICATIONS

George Kallistratos "Fluorescent Properties of Aromatic Complexes with Rare Earths And Other Elements of the III α–Group" May 24, 1982 Chimka Chronika, New Series 11 249–266.

Ingmar Grenthe "Stability Relationships Among The Rare Earth Dipicolinates" Jan. 20, 1961.

*Primary Examiner*—Paul R. Michl
*Assistant Examiner*—John J. Guarriello
*Attorney, Agent, or Firm*—Ronald Reichman; Melvin J. Scolnick

[57] ABSTRACT

Wax based invisible inks have been discovered that emit light at various wavelengths in the visible region when they are excited by UV light. This allows lower layer clear text information to be written on an object with a regular, visible ink and an upper layer bar code to be written over the lower layer text information with an ink that is invisible to the naked eye. This allows the lower layer text information and upper layer bar code to contain more information than conventional bar codes. These inks allow printing and decoding invisible bar codes over printed information with visible inks. The detection by fluorescence of these invisible inks provides a high signal to noise ratio and no interference with the visible printed information.

5 Claims, 5 Drawing Sheets

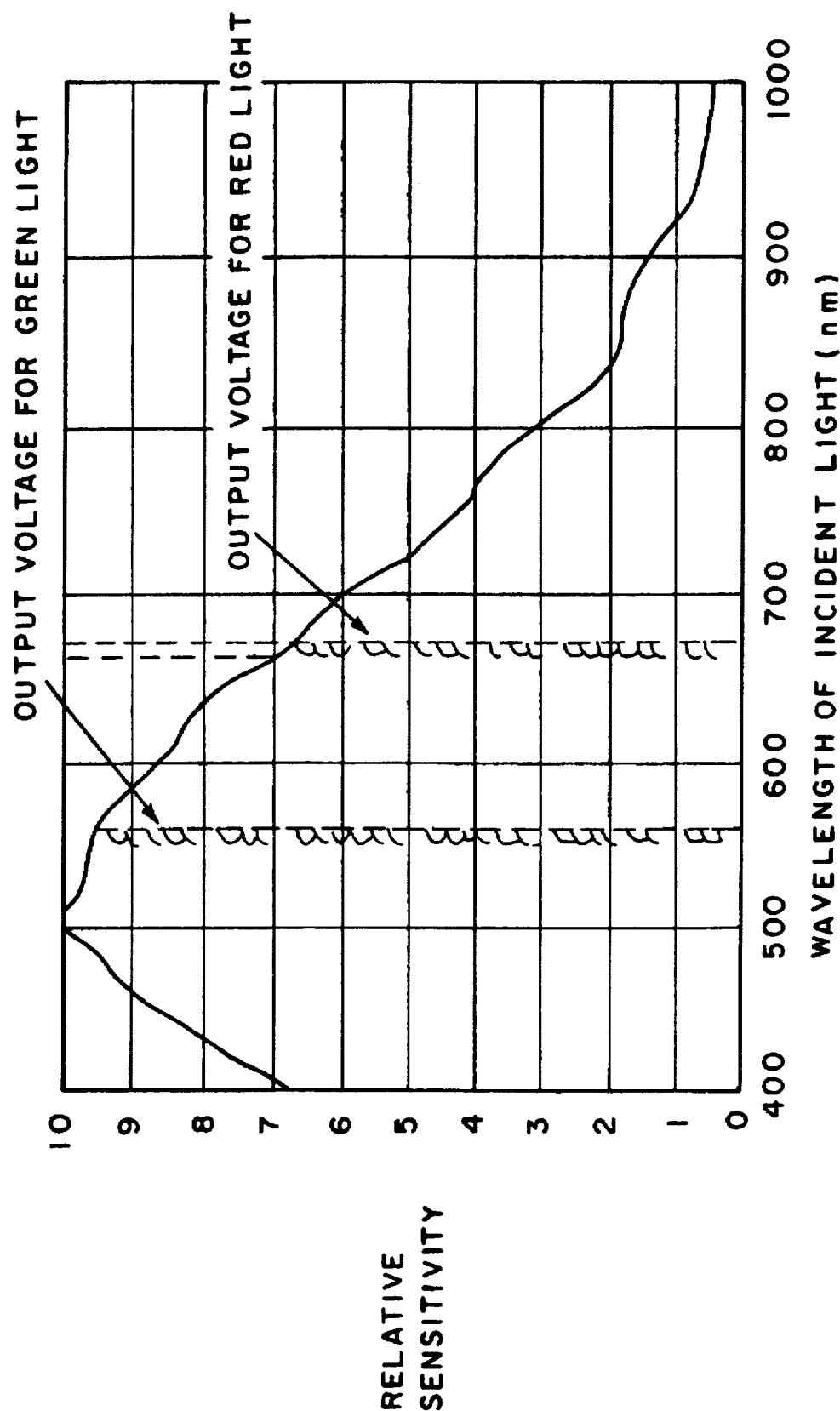

BAR CODE PRINTING AND SCANNING USING WAX BASED INVISIBLE FLUORESCENT INKS

CROSS REFERENCE TO RELATED APPLICATIONS

Reference is made to commonly assigned patent application Ser. No. 08/347,740, U.S. Pat. No. 5,542,971, filed herewith entitled "Bar Code Using Luminescent Invisible Inks" in the names of Judith Auslander and William Berson, U.S. Pat. No. 5,502,304, filed herewith entitles "Bar Code Scanner For Reading Luminescent Invisible Inks" in the names of William Berson and Judith Auslander and Ser. No. 08/547,629, U.S. Pat. No. 5,525,798, filed herewith entitled "Bar Code Scanner For Reading A Lower Layer Luminescent Invisible Ink That Is Printed Below A Upper Layer Luminescent Invisible Ink" in the names of William Berson and Judith Auslander.

FIELD OF THE INVENTION

The invention relates generally to the field of encoding marks and more particularly to bar codes.

Background of the Invention

Bar codes have been used in a wide variety of applications as a source for information. Typically bar codes are used at a point-of-sale terminal in merchandising for pricing and inventory control. Bar codes are also used in controlling personnel access systems, mailing systems, and in manufacturing for work-in process and inventory control systems, etc. The bar codes themselves represent alphanumeric characters by series of adjacent stripes of various widths, i.e. the universal product code.

A bar code is a set of binary numbers. It consists of black bars and white spaces. A wide black bar space signifies a one and a thin black bar or space signifies a zero. The binary numbers stand for decimal numbers or letters. There are several different kinds of bar codes. In each one, a number, letter or other character is formed by a certain number or bars and spaces.

Bar code reading systems or scanners have been developed to read bar codes. The bar code may be read by having a light beam translated across the bar code and a portion of the light illuminating the bar code is reflected and collected by a scanner. The intensity of the reflected light is proportional to the reflectance of the area illuminated by the light beam. This light is converted into an electric current signal and then the signal is decoded.

Conventional bar codes are limited in the amount of information they contain. Even two dimensional bar codes such as PDF-417 and Code-1 are limited to a few thousand bytes of information. The ability to encode greater information density is limited by the resolution of available scanning devices.

The prior art has attempted to use colored bar codes to convey additional information. However, color printing is inherently analog and the fastness, reproducibility and selective delectability of colored bar code imprints as well as the impractically of reproducibly calibrating detection systems, prohibit their use for the digital encoding of additional information.

Bar codes have been affixed to many different types of documents, so that they may be read by a machine, thereby reducing labor costs. Documents that include bar codes have been issued by governmental agencies, financial institutions, brokerage houses, etc., that authorize the holder of such documents to perform authorized tasks or grant rights to the holder of such a document. Examples of such documents are drivers licenses, entry access badges, identification cards, etc. In issuing such documents, it is desirable to have them of a convenient size, while including information necessary for identifying the holder of the document and the rights conferred. Thus, oftentimes, there is not enough room to include the bar code with all of the information one would want to include in the bar code.

Another problem encountered by the prior art when bar codes were affixed to documents is that the bar codes were not to difficult to forge and could be easily copied, hence there was unauthorized use of the documents to which the bar codes were affixed.

SUMMARY OF THE INVENTION

This invention overcomes the disadvantages of the prior art by providing an invisible ink for printing bar codes on documents, including identification cards, mail pieces and drivers licenses, etc. The visible clear text printing is underneath the bar code and may be read. The invisible transparent bar code is printed with a UV excited pigment emitting in either the red or green regions of the visible. The formulation and choice of the pigment provides for a high signal to noise ratio in the scanner in that the detector is blind to the illumination source, but sensitive to the emitted signal.

The invisible inks of this invention may be used in thermal transfer printing or in hot melt ink jet.

The invisible inks used are based upon wax dispersions or solutions of invisible pigments in typical thermal transfer vehicles such as wax mixtures.

The invisible fluorescent inks can contain organic pigments such as: derivatives benzoxazine and benzoxazinone or complexes of rare earth elements with ligands containing β diketones of the general formula:

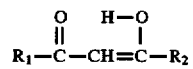

where $R_1$ and $R_2$ are identical radicals or different and can be: alkyl with $C^1$–$C_{18}$ or halogenated alkyl of the same length, alkoxy, phenyl, substituted phenyl, furyl, substituted furyl, thienyl, substituted thionyland. Other printing technology and vehicle that can be used is the hot melt ink jet. Another ligand type is represented by the formula:

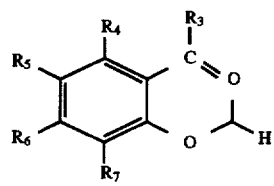

where: $R_3$ is an alkyl group $C_1$–$C_{18}$ or an halogenated alkyl with the same length. R4, R5, R6 and R7 are identical groups or different. (Another ligand that can be used is the dipicolinic acid). An example of ligand that bonds through Nitrogen ion is 2,2' bipyridine.

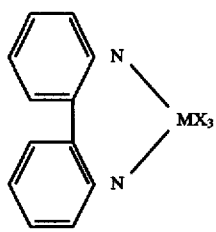

Where M is a $L_n^{3+}$ ion or any rare earth ion and X is an anion such as Cl or $NO_3$.

BRIEF DESCRIPTION OF THE DRAWING

FIG. 5 is a graph of the sensitivity of detector 44.

DETAILED DESCRIPTION OF THE PREFERRED EMBODIMENT

Figure 1:
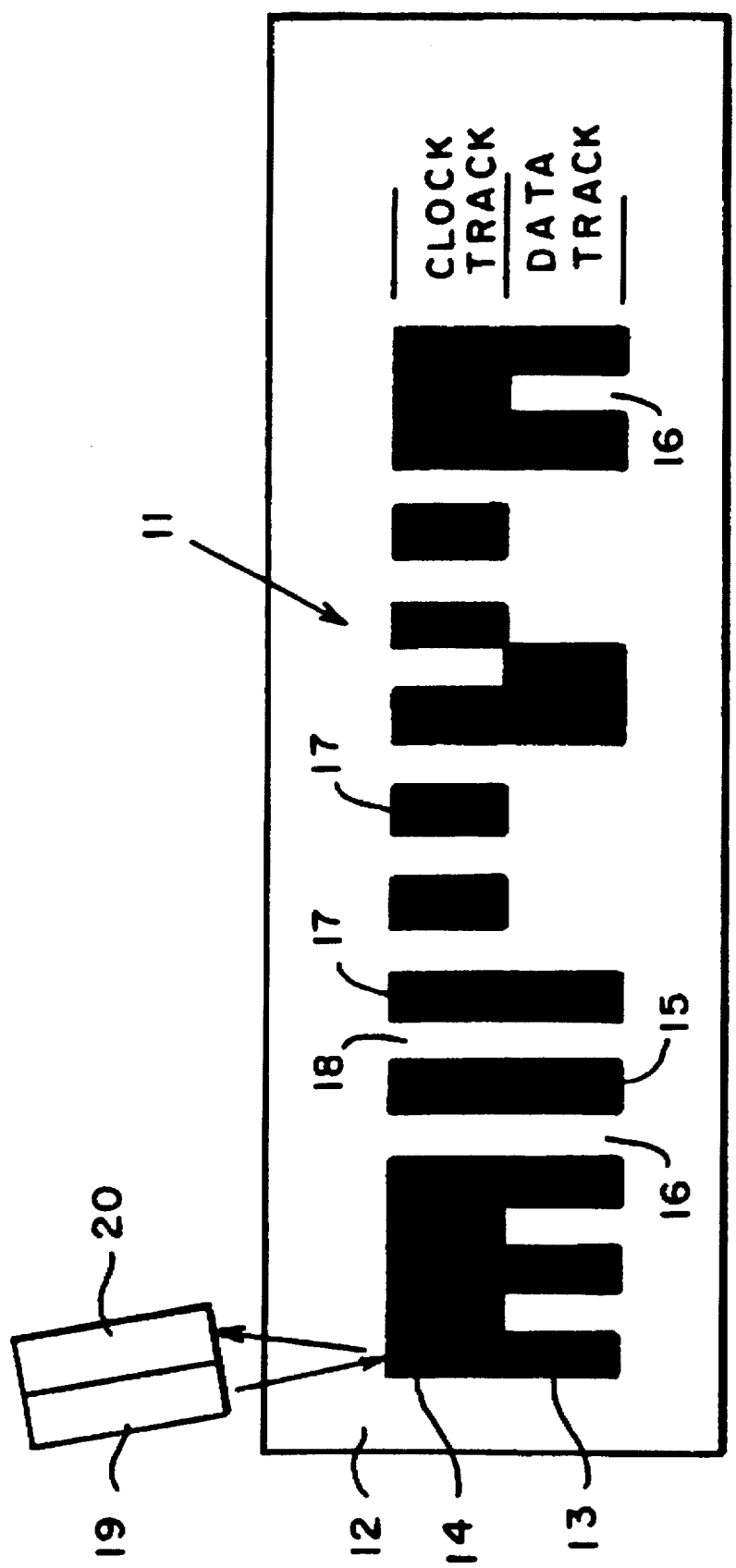
FIG. 1 is a drawing of a bar code that was utilized by the prior art.

In order to better understand that which separates this invention from the prior art consider the following. Refer to the drawings in detail, and more particularly to FIG. 1 a prior art bar code 11 is printed on an object 12. Bar code 11 has a data track 13 and a clock track 14. A black bar 15 would indicate a binary one in the data track and a white space 16 would indicate a zero in the data track. A black bar 17 would indicate a binary one in the clock track and a white space 18 would indicate a binary zero in the clock track.

The information contained in bar code 11 is illuminated by light source 19, reflected by bar code 11 and read by scanner 20.

Thus, FIG. 1 illustrates the amount of information that may be contained in a prior art black and white bar code.

Figure 2:
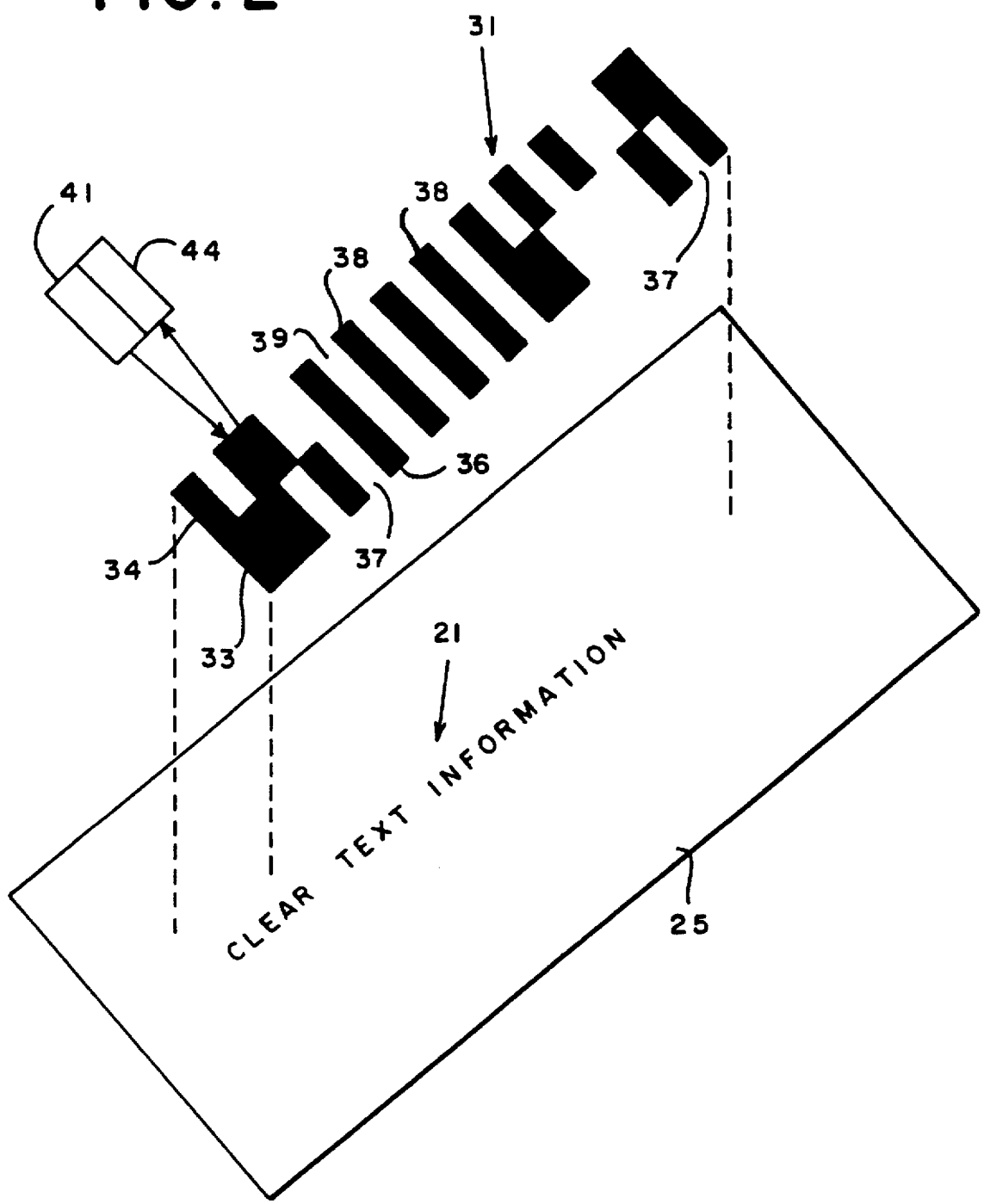
FIG. 2 is a drawing of the bar code of this invention.

FIG. 2 is a drawing of the bar code of this invention. Lower layer clear text information 21 is printed on object 25 with a visible ink. Object 25 is any surface known in the art in which inks may be printed on i.e.; paper, envelopes, cardboard, plastic, etc.

An upper layer bar code 31 is printed over clear text information 21. Bar code 31 is printed with an invisible ink. Bar code 31 has a data tract 33 and a clock track 34. A dark bar 36 or space containing ink would indicate a binary one in the data track and an empty space 37 or space containing no ink would indicate a zero in the data track. A dark bar 38 or space containing ink would indicate a binary one in the clock track and an empty, space or space containing no ink would indicate a binary zero in the clock track.

It will be obvious to one skilled in the art that bar code 31 may be printed with an invisible ink on object 25 even though no clear text information 21 is printed on object 25.

The inks that are used to print clear text information 21 and bar code 31 may be applied using non impact printing methods i.e. thermal transfer, hot melt ink jet, etc. All the various mixtures of wax performing in these two technologies: thermal transfer or hot melt ink jet can be used. The inks used to print clear text information 21 and 31 are similar and may have similar reflectance wavelengths to the emission wavelength of the ink used to print bar code 31. The ink that is used to print bar code 31 is invisible to the naked eye and can be excited by ultra violet light. Examples of the ink that is used to print bar code 31 is based on wax dispersions or solutions of organic fluorescent pigments such as derivatives of benzoxazine and benzoxazinone and organic complexes of, rare earth elements (acetonates), such as: europium, gadolinium and terbium acetonates.

The advantages of using the above luminescent pigments are that they are spectrally well defined and can be mechanically read at a high speed without physical contact. The luminescent excitation is obtained by UV radiation. The luminescent signals are relatively insensitive to the environment i.e., dirt, temperature, etc. The light fastness values are good for most practical applications and the inks have a high degree of specificity due to their discrete emission spectra.

The invisible inks used are based on complexes of rare earth elements with an atomic number higher than 57 such as: Eu, Tb, Sm, Dy with various chelating agents providing chromophore ligands that absorb in the ultraviolet and the blue region of the spectra such as: p acetone and its derivatives etc. The luminescent emission in these complexes is due to inner transitions such as: $^5D_0 \rightarrow {^7F_1}$ and $5D^0 \rightarrow {^7F_2}$ for Europium. All of the above chelates of rare earth metals show a strong ultraviolet absorption in the ultraviolet region of the spectra. Through an internal conversion and systems interference part of this energy is transferred to the rare earth ion which is excited to the electronic level of luminescence.

The ink that is used to print clear text information 21 is a regular ink which absorbs in the visible range of the spectrum between (400–700 nm) and has a print contrast signal with a background of more than 0.4. An example of the above ink is any black ink that is currently being used in an ink jet printer, i.e. the desk jet printer manufactured by Hewlett Packard.

The general composition of the ink that is used to print bar code 31 is based on wax dispersions or solutions of invisible organic fluorescent pigments such as derivatives of benzoxazine and benzoxazinone or complexes of rare earth elements with ligands containing β diketones.

The main spectral emission characteristics of the pigments have to match the spectral response of the scanner's detector and conversely the scanner should be blind to the incident illumination of the excitation source. This eliminates the effects of spurious reflections which tend to lower the signal to noise ratio and degrade the detection efficiency.

In the first implementation, the excitation light source is chosen to be in the UV range of 350–380 nm and the emission of the pigment is chosen to be in the range of either the red or the green visible. The detector is relatively insensitive in the UV range and may be made blind to the 350–380 nm. by the addition of a filter.

Particle size of the pigment must be selected to enhance the contrast between the detected signal and the background, therefore to give sufficient emission for adequate signal (adequate fluorescence quantum yield). Particle size which are read too small will have insufficient signal. Also, the particle size should be sufficiently small in order to provide a stable dispersion.

The spectral characteristics are shown in FIG. 5. The average particle life of the organic pigments used herein is 1.5–2.8μ.

The ink vehicle must be also chosen for compatibility so that the fluorescent emission is not absorbed.

EXAMPLE 1 For Thermal Transfer Ink

| Ingredient | Manufacturer (Trade Name) | WT (gms) |
|---|---|---|
| Lumilux Yellow CD 799 | Riedel de Haen | 5.00 |
| Polyethylene wax-molecular weight 500, melting point 88° C. | (Polywax 500) Petrolite | 64.1 |
| urethane derivative of synthetic wax | (WB-17) Bareco Div., Petrolite | 7.2 |
| carnauba wax | Strahl & Patsch Inc. | 8.2 |
| Ethyl Vinyl Acetate Polymer | Dupont | 15.5 |
| Ink properties | | |

Excitation 360 nm
Emission 525 nm

The ink was applied to a polyethylene tetraphthalate film with the results discussed below.

The inks of the instant invention exhibit good adhesion to a thermal ribbon film and to a non-porous surface, such as plastic, when applied thereto in a thermal printing operation. These inks have the characteristics of a low melting point which results in good transferability, good flexibility for non-flaking, high hardness that yields high mechanical abrasion resistance and prevents smudging of the final print, water fastness, high light fastness and good contrast properties. The inks were found to have good slip and are free of blocking characteristics.

The ink vehicle must be also chosen for compatibility so that the fluorescent emission is not absorbed.

EXAMPLE 2 For Thermal Transfer Ink

| Ingredient | Manufacturer (Trade Name) | WT (gms) |
|---|---|---|
| Lumilux Green CD 702 | Riedel de Haen | 10 |
| Polyethylene wax-molecular weight 500, melting point 88° C. | (Polywax 500) Petrolite | 59.1 |
| urethane derivative of synthetic wax | (WB-17) Bareco Div., Petrolite | 7.2 |
| carnauba wax | Strahl & Patsch Inc. | 8.2 |
| Ethyl Vinyl Acetate Polymer | Dupont | 15.5 |

The main spectral emission characteristics of the fluorescent pigments used are: either organic of the benzoxazine or benzoxazione type, or inorganic such as silicates or terbium or europium.

EXAMPLE 3

| Ingredient | Manufacturer (Trade Name) | WT (%) |
|---|---|---|
| Benzoxazinone derivative | Riedel de Haen | 5 |
| Lumilux Green CD 702 wax emulsion Michelson 126 | Riedel de Haen Michelson | 90 |
| Igepal 530 | GAF | 5 |
| Ink properties | | |

Emission peak 522 nm

EXAMPLE 4

| Ingredient | Manufacturer (Trade Name) | WT (%) |
|---|---|---|
| Benzoxazinone derivative | Riedel de Haen | 7 |
| Lumilux Green CD 797 wax emulsion Michelson 126 | Riedel de Haen Michelson | 90 |
| Igepal 530 | GAF | 3 |
| Ink properties | | |

Emission peak 535 nm

The invention is the ink, printing system and scanner for printing invisible or transparent bar-codes on documents, including identification cards, mail and drivers licenses. The visible clear text printing is underneath the bar-code and may be read. The invisible, transparent bar-code is printed with a UV-excited pigment emitting in either the red or green regions of the visible. The formulation and choice of pigment provides for a high signal-to-noise ration in the scanner in the detector is blind to the illumination source, but sensitive to the emitted signal.

In production of drivers licenses, identification cards and other valuable documents, it is desirable to apply the use of bar-codes, especially encrypted bar-codes.

The operation using the luminescent characteristics of the rare earth complexes are used as binary characteristics for their absence or prescience or they can be used at various intensities. The advantage is that the signal to noise ratio is extremely high for the invisible ink that allows a precision that can not be attained by identification of visible contrast.

The invisible inks can be used also by varying the intensity and therefore encoding more information, but in this case the parasite signals can not be eliminated such as in the case of binary signals.

The information contained in clear bar code 31 may be read by utilizing light sources 41. Source 41 is utilized to illuminated bar code 31. Source 41 is a ultraviolet source that emits light between 240–400 nm. Detector 44 is utilized to sense bar code 31.

Detector 44 senses the emitted light from bar code 31. Detector 44 may be a photo diode or photo transistor.

Figure 3:
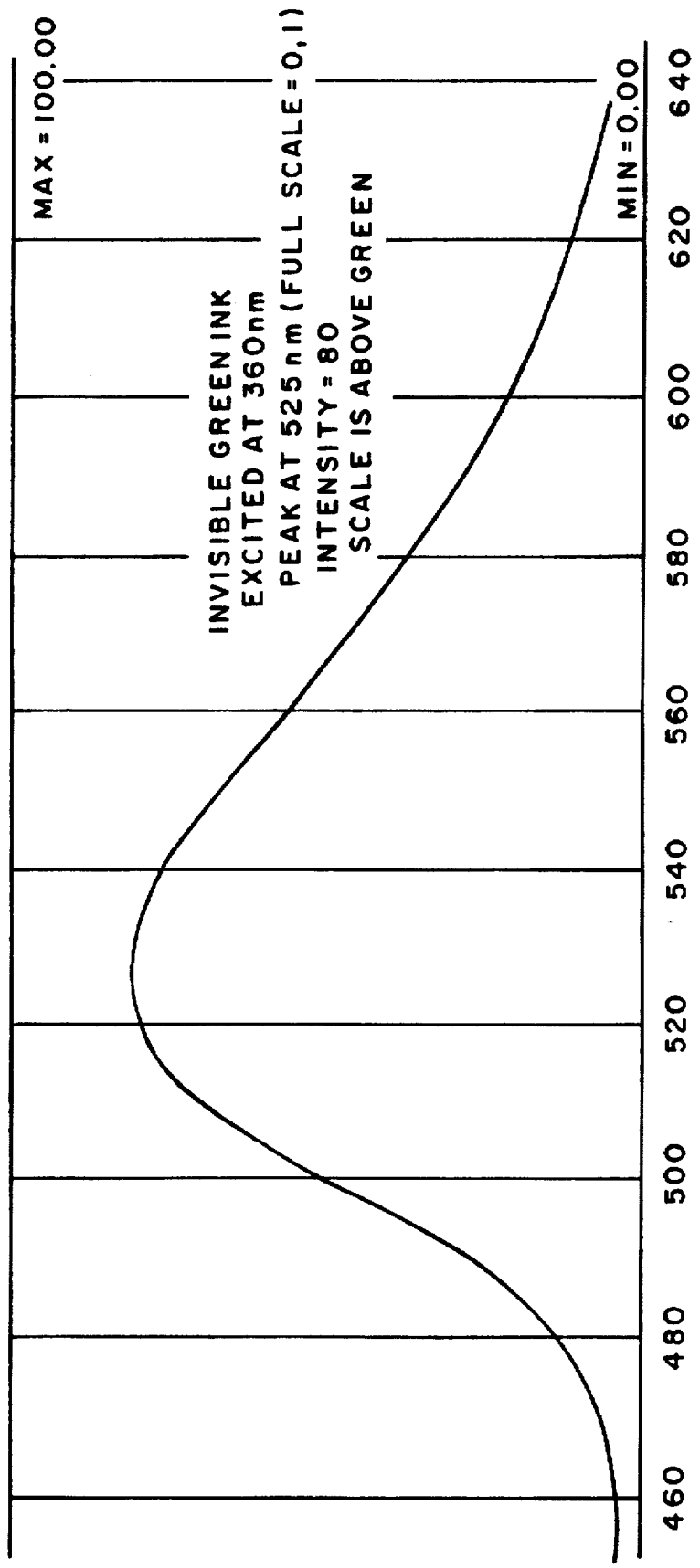
FIG. 3 is a graph of the emission of the invisible wax based ink of this invention that shows green fluorescence.

FIG. 3 is a graph of the emission of the invisible green ink used to print bar code 31 which was excited at 360 nm.

Figure 4:
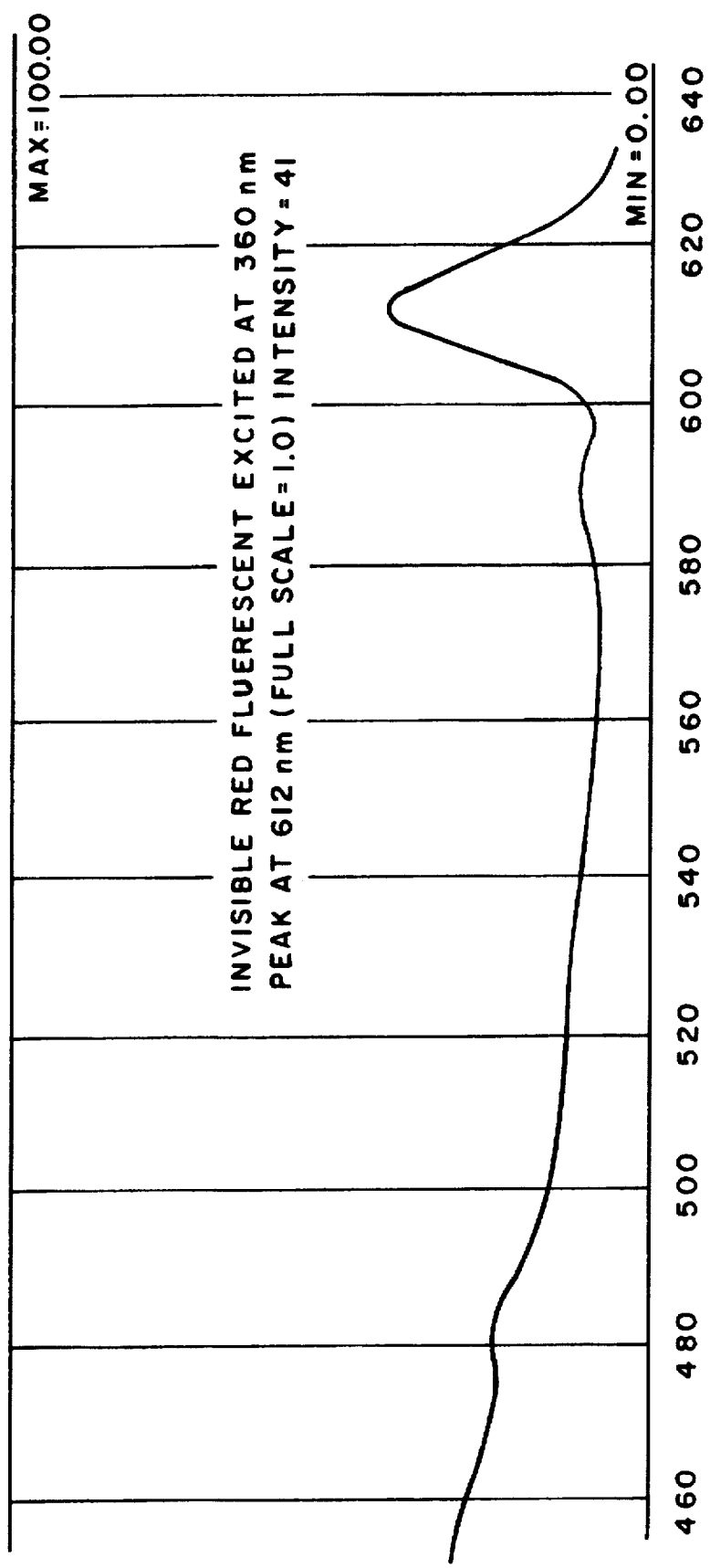
FIG. 4 is a graph of the excitation of the emission of the invisible wax based ink of this invention that shows red fluorescence.

FIG. 4 is a graph of the emission of the invisible red ink used to print bar code 31 which was excited at 360 nm.

FIG. 5 is a graph showing the spectral characteristics of detector 44.

The above embodiments have been given by way of illustration only, and other embodiments of the instant invention will be apparent to those skilled in the ad from consideration of the detailed description. Accordingly, limitations on the instant invention are to be found only in the claims.

What is claimed is:

1. An ink composition comprising:
   a) 0.5 to 10% of 2-aryl-4H3, 1 or 2-(2-arylsulfonylaminophenyl-4H-3, 1-G benzoxazinone, 4);
   b) 65 to 85% of urethane compound of a synthetic petroleum wax;
   c) 4 to 15% carnauba wax; and
   d) 10 to 20% ethyl vinyl acetate polymer.

2. An ink composition comprising:

a) 0.5 to 10% complexes of rare earth metal ions $M^{3+}$, of the general formula:

$$BM(L_2)$$

where;

B is a cation such as $Na^+$, $Li^+$, $NH_4^+$;

M is a metal ion from the lanthanide group; and

L is a chromphore ligand dispersed in;

b) the complexes are dissolved in 65 to 85% of a wax selected from polyethylene wax, natural parafin wax and urethane derivative of oxidized synthetic wax;

c) 4 to 15% carnauba wax; and d) 10 to 20% ethyl vinyl acetate polymer.

3. The complex claimed in claim 2, wherein the lanthanide is selected from the group of $Pr^{3+}$, $Nd^{3+}$, $Sm^{3+}$, $Eu^{3+}$, $Tb^{3+}$, $Dy^{3+}$, $Yb^{3+}$, $Er^{3+}$, and $Tm^{3+}$.

4. The composition claimed in claim 2, wherein the chromophore ligand is selected from the group of β diketones of the general formula:

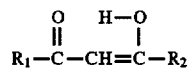

where $R_1$ and $R_2$ belong to the groups of the alkyl radical $C^1$–$C_{18}$ radical of halogenated $C^1$–$C_{18}$, (fluorinated or chlorinated) radical, phenyl, and thienyl.

5. The ink claimed in claim 2, wherein the chromphore ligand can be represented by the formula:

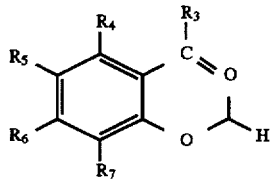

where: $R_3$ is an alkyl group $C_1$–$C_{18}$ or an halogenated alkyl with the same length. R4, R5, R6 and R7 are identical groups or different.

* * * * *